(12) United States Patent  
Reuber

(10) Patent No.: US 8,629,366 B2
(45) Date of Patent: Jan. 14, 2014

(54) MEDIUM VOLTAGE CIRCUIT BREAKER ARRANGEMENT

(75) Inventor: Christian Reuber, Willich (DE)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 13/476,421

(22) Filed: May 21, 2012

(65) Prior Publication Data

US 2012/0292163 A1 Nov. 22, 2012

Related U.S. Application Data

(63) Continuation of application No. PCT/EP2010/006992, filed on Nov. 17, 2010.

(30) Foreign Application Priority Data

Nov. 20, 2009 (EP) .................................... 09014477

(51) Int. Cl.
    *H01H 33/70* (2006.01)
(52) U.S. Cl.
    USPC .............................................. 218/44; 218/66
(58) Field of Classification Search
    USPC ................................. 218/44, 66–67
    See application file for complete search history.

(56) References Cited

U.S. PATENT DOCUMENTS

| 3,502,834 A | | 3/1970 | Field et al. | |
| 3,793,494 A | * | 2/1974 | Cleaveland | 200/50.22 |
| 3,924,088 A | * | 12/1975 | Heutschi et al. | 218/67 |
| 3,946,183 A | * | 3/1976 | Milianowicz | 218/66 |
| 3,983,460 A | * | 9/1976 | Kuhn et al. | 361/626 |
| 4,440,998 A | * | 4/1984 | McConnell et al. | 218/44 |
| 4,650,939 A | * | 3/1987 | Milianowicz | 218/118 |
| 5,095,183 A | | 3/1992 | Raphard et al. | |
| 6,130,594 A | | 10/2000 | Morant et al. | |
| 6,232,571 B1 | | 5/2001 | Starck et al. | |
| 2001/0017288 A1 | | 8/2001 | Morita et al. | |

FOREIGN PATENT DOCUMENTS

| DE | 10129747 C1 | 2/2003 |
| EP | 0378950 A1 | 7/1990 |
| EP | 0898780 B1 | 4/2000 |
| EP | 1030334 A1 | 8/2000 |
| EP | 1128409 A2 | 8/2001 |
| EP | 1416503 A2 | 5/2004 |
| EP | 1975960 A1 | 10/2008 |
| EP | 2071687 A1 | 6/2009 |

OTHER PUBLICATIONS

Shannon Soupiset et al., The Magnetically Actuated Circuit Breaker Reality, Mar. 27, 1999 ABB Power T&D Company, pp. 1-8.

(Continued)

*Primary Examiner* — Truc Nguyen
(74) *Attorney, Agent, or Firm* — Buchanan Ingersoll & Rooney PC

(57) ABSTRACT

Exemplary embodiments are directed to a medium voltage circuit breaker arrangement that includes at least one pole part housing for accommodating a pair of coaxially arranged electrical contacts, wherein one electrical contact of the pair of electrical contacts is axially movable via a jackshaft arrangement which is accommodated in a recasted sheet metal housing, and driven by an actuator unit. The sheet metal housing forms a suspension construction for the at least one pole part housing and the jackshaft arrangement and the corresponding actuator unit forming a module. An additional housing part is provided for covering at least the actuator unit of the module in order to define the outer geometrical dimensions of the circuit breaker arrangement.

20 Claims, 4 Drawing Sheets

(56) References Cited

OTHER PUBLICATIONS

International Search Report (PCT/ISA/210) issued on Feb. 9, 2011, by the European Patent Office as the International Searching Authority for International Application No. PCT/EP2010/006992.

Written Opinion (PCT/ISA/237) issued on Feb. 9, 2011, by the European Patent Office as the International Searching Authority for International Application No. PCT/EP2010/006992.

European Search Report issued on Mar. 31, 2010 for European Application No. 09014477.5.

\* cited by examiner

MEDIUM VOLTAGE CIRCUIT BREAKER ARRANGEMENT

RELATED APPLICATIONS

This application claims priority as a continuation application under 35 U.S.C. §120 to PCT/EP2010/006992, which was filed as an International Application on Nov. 17, 2010 designating the U.S., and which claims priority to European Application 09014477.5 filed in Europe on Nov. 20, 2009. The entire contents of these applications are hereby incorporated by reference in their entireties.

FIELD

The present disclosure relates to a medium voltage circuit breaker arrangement including at least one pole part housing for accommodating a pair of coaxially arranged electrical contacts, wherein one electrical contact of the pair of electrical contacts is axially moveable via a jackshaft arrangement, which is accommodated in a recasted sheet metal housing and is driven by an actuator unit.

BACKGROUND INFORMATION

Known circuit breakers are widely used for medium voltage applications in the range between 1 and 72 kV of a high current level for interruption of electrical circuitries of power grids.

These special circuit breakers interrupt the current by creating and extinguishing the arc in a closed vacuum chamber. Modern vacuum circuit breakers attend to have a longer life expectancy than conventional air circuit breakers. Nevertheless, the present disclosure is not only applicable to vacuum circuit breakers but also to air circuit breakers or modern SF6 circuit breakers.

Generally, a medium voltage circuit breaker includes (e.g., consists mainly of) one or several pole parts, at least one actuator unit and a gear and/or shaft assembly for transmission of the operation force from the actuator unit to the at least one pole part. The number of the pole parts corresponds to the number of phases of the power grid. All these parts are usually accommodated in a common housing. The housing is an integral part of the circuit breaker which cannot be assembled without the housing.

The article "The magnetically actuated circuit breaker reality" (ABB wide paper, ABB power T & D Company, 1999, pages 1-8) discloses such a circuit breaker with a common housing. The same housing is used for accommodating an actuator unit together with a jackshaft arrangement coupled thereon. Separate pole parts have own housings which can include (e.g., consist of) moulded plastics insulating material. The pole part housings are detachably connected on the common housing by screws. The common housing for the actuator unit and the jackshaft arrangement includes (e.g., consists of) a recasted sheet metal housing. The common housing realizes a mechanical connection between the actuator unit and the pole parts which is relatively rigid in order to avoid loss of drive energy. The common housing defines the outer dimensions of the circuit breaker arrangement in order to ensure an attachment interface in a switch board. Therefore, the common housing is normally made of sheet metals. The material is relatively thick to achieve the desired rigidity. In case the common housing of a circuit breaker is made of plastic material, it can be difficult to obtain the specified rigidity without additional steel parts. Different types of switch boards and applications often specify dedicated types of circuit breakers that are different from the very beginning of their production, as they are basing on different housings. This makes an automatic assembly more difficult. A further disadvantage of prior art designs is that a high variance of large and heavy housings presents a logistics problem, especially considering world-wide sourcing.

The patent document EP 0 898 780 B1 discloses a magnetically actuated circuit breaker for medium voltage applications. A single electromagnetic actuator drives a common jackshaft assembly. The jackshaft assembly couples the actuator force to the moving electrical contacts of each pole part containing vacuum interrupter inserts of a pair of electrical contact parts switchable through insulated push rods.

Each pole part has an own housing which is screwed on a mounting surface of a housing which only contains the jackshaft assembly. The housing of the jackshaft assembly includes (e.g., consists of) a recasted sheet metal forming a box which is underside opened in order to gain access to the jackshaft assembly. However, the housing of the actuator unit is not connected to the housing of the jackshaft assembly.

Exemplary embodiments of the present disclosure provide a housing arrangement for a medium voltage circuit breaker which is easy to manufacture and allows an easy mounting of the several parts at one hand and, moreover, which defines a geometrical mounting interface for easily adapting to various different applications.

SUMMARY

An exemplary medium voltage circuit breaker arrangement is disclosed, comprising: at least one pole part housing for accommodating a pair of coaxially arranged electrical contacts, wherein one electrical contact of the pair of electrical contacts is axially movable via a jackshaft arrangement which is accommodated in a recasted sheet metal housing, and driven by an actuator unit, wherein the sheet metal housing forms a suspension construction for the at least one pole part housing, the jackshaft arrangement, and the actuator unit forming a module, and wherein an additional housing part is provided for covering at least the actuator unit of the module to define outer geometrical dimensions of the circuit breaker arrangement.

An exemplary gas-insulated switchboard is disclosed comprising: a medium voltage circuit breaker arrangement that includes: at least one pole part housing for accommodating a pair of coaxially arranged electrical contacts, wherein one electrical contact of the pair of electrical contacts is axially movable via a jackshaft arrangement which is accommodated in a recasted sheet metal housing, and driven by an actuator unit, wherein the sheet metal housing forms a suspension construction for the at least one pole part housing, the jackshaft arrangement, and the actuator unit forming a module, and wherein an additional housing part is provided for covering at least the actuator unit of the module to define outer geometrical dimensions of the circuit breaker arrangement.

An exemplary air-insulated switchboard is disclosed comprising: a medium voltage circuit breaker arrangement that includes: at least one pole part housing for accommodating a pair of coaxially arranged electrical contacts, wherein one electrical contact of the pair of electrical contacts is axially movable via a jackshaft arrangement which is accommodated in a recasted sheet metal housing, and driven by an actuator unit, wherein the sheet metal housing forms a suspension construction for the at least one pole part housing, the jackshaft arrangement, and the actuator unit forming a module, and wherein an additional housing part is provided for covering at least the actuator unit of the module to define outer geometrical dimensions of the circuit breaker arrangement.

An exemplary dead tank breaker for outdoor use is disclosed, comprising: a medium voltage circuit breaker arrangement that includes: at least one pole part housing for accommodating a pair of coaxially arranged electrical contacts, wherein one electrical contact of the pair of electrical contacts is axially movable via a jackshaft arrangement which is accommodated in a recasted sheet metal housing, and driven by an actuator unit, wherein the sheet metal housing forms a suspension construction for the at least one pole part housing, the jackshaft arrangement, and the actuator unit forming a module, and wherein an additional housing part is provided for covering at least the actuator unit of the module to define outer geometrical dimensions of the circuit breaker arrangement.

BRIEF DESCRIPTION OF THE DRAWINGS

The foregoing and other aspects of the disclosure will become apparent following the detailed description of the disclosure when considered in conjunction with the enclosed drawings, wherein.

DETAILED DESCRIPTION

Figure 1:
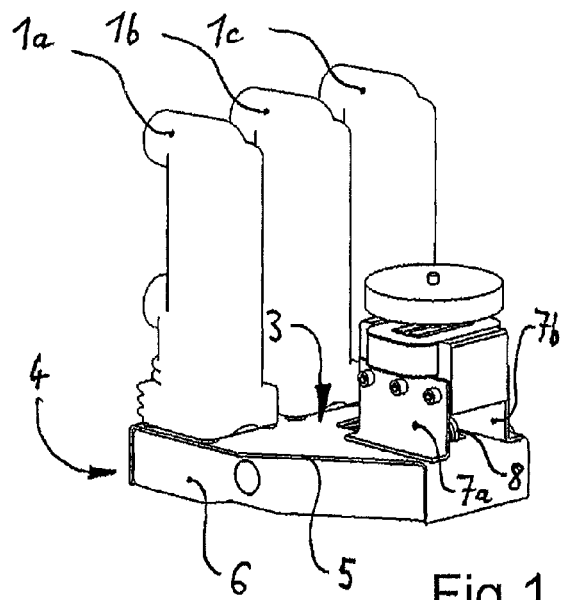
FIG. 1 is a perspective view to a medium voltage circuit breaker arrangement including three pole parts in accordance with an exemplary embodiment of the present disclosure.

According to an exemplary embodiment disclosed herein a special sheet metal housing is designed for suspension construction of the at least one pole part housing and the jackshaft arrangement and the corresponding actuator unit in order to form a universal module, wherein an additional housing part is provided for covering at least the actuator unit of the module.

Both housings in combination define the outer geometrical dimensions of the circuit breaker arrangement. The disclosed exemplary embodiment can provide the separation of the suspension or supporting function on one hand and the housing function for defining the outer geometrical dimensions on the other hand. The mechanical connection of the at least one pole part and the actuator unit shall be realized by a very compact and rigid housing part made of sheet metal. This connection, together with the at least one pole part and the actuator unit with its jackshaft arrangement for transmission, forms a kind of core circuit breaker arrangement. The outer dimensions can then be realized by an add-on part that can be made relatively light and thin, e.g. from plastics material. This add-on part can also provide the area for further components of the circuit breaker arrangement, e.g. energy storage means, control or auxiliary switching means.

According to exemplary embodiments disclosed herein the circuit breaker has a base frame connected to earth contact, pole parts, mechanical coupling means and an actuator, and the base frame is coupled with a mechanical adaption interface such that the base frame can be adapted to be used in at least an air-insulted switchgear, a gas-insulated switchgear, and an outdoor switchgear. As a result, exemplary embodiments of the present disclosure make it possible to manufacture a basic switchgear for different applications. An exemplary switchgear can be mechanically adaptable by changing the mechanical interface such that one common unit can be manufactured for different uses.

According to another exemplary embodiment of the present disclosure, the separate housing part could be connected to the sheet metal housing via clip connection means. This inter housing connection does not call for a strong attachment since the additional housing part mainly serves as a cover.

The sheet metal housing can include (e.g., consists of) a bended U-shaped sheet metal part with separate side cover parts for covering the open sides of the U-shaped sheet metal in order to form a box-shaped housing arrangement containing the jackshaft arrangement. Both side cover parts should include e.g., consist of) the same sheet material than the U-shaped sheet metal part in order to allow a permanent joint by bracing or welding.

In an exemplary embodiment the housing arrangement disclosed herein on a mounting surface of the U-shaped sheet metal part includes an arrangement of a pair of L-shaped holding plates. The L-shaped holding plates provide a detachable connection to the common actuator unit and they are adjacent arranged to an intermediate opening for coupling the driveshaft of the actuator unit to the jackshaft arrangement for transmission the operating force to the at least pole part. The common actuator unit can be realized as single-coil or a double-coil electromagnetic actuator which as small geometrical dimensions.

The mounting surface of the U-shaped sheet metal part three pole part housings can be connected by screw connecting means in order to provide a three-pole circuit breaker. Of course, different numbers of pole parts are possible in view of the disclosed exemplary embodiments.

FIG. 1 is a perspective view to a medium voltage circuit breaker arrangement including three pole parts in accordance with an exemplary embodiment of the present disclosure. According to FIG. 1 a medium voltage circuit breaker arrangement includes three pole part housings 1a-1c for accommodating—not shown—electrical switching means which are operated by a common actuator unit 2. The actuator unit 2 is realized as a single-coil electromagnetic actuator. The pole part housings 1a-1c as well as the actuator unit 2 are mounted on a mounting surface 3 of a sheet metal housing 4.

The sheet metal housing 4 is designed to form a support construction for the pole part housings 1a-1c which are directly attached to the mounting surface 3 by screw means. Furthermore, the sheet metal housing accommodates the—not shown—jackshaft arrangement for the actuator unit 2 which is also detachably connected to the sheet metal housing 4 by screw means. The three pole part housings 1a-1c of each pole part and the common drive unit 2 are mounted on the mounting surface 3 of a U-shaped sheet metal part 5, realizing a rigid body of the circuit breaker arrangement.

In order to form a box-shaped housing for accommodating the—not shown—jackshaft arrangement the U-shaped sheet metal part 5 includes two opposite side cover parts 6, which include the same material as the U-shaped metal part 5 in order to attach them one to another by welding. On the mounting surface 3 of the U-shaped sheet metal part 5 a pair of L-shaped holding plates 7a and 7b are arranged adjacent to an intermediate opening 8 for coupling the actuator unit 2 to the—not shown—inner jackshaft arrangement.

Figure 2:
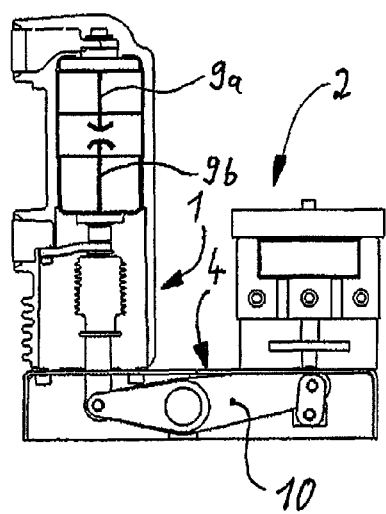
FIG. 2 is a longitudinal section through the circuit breaker according to FIG. 1 in accordance with an exemplary embodiment of the present disclosure.

FIG. 2 is a longitudinal section through the circuit breaker according to FIG. 1 in accordance with an exemplary embodiment of the present disclosure. As shown in FIG. 2, the circuit breaker arrangement includes the pole part housing 1 for accommodating a pair of coaxially arranged electrical contacts 9a and 9b, wherein the lower electrical contact 9b is axially moveable via a jackshaft arrangement 10. The jackshaft arrangement 10 is accommodated in a recasted sheet metal housing 4. The jackshaft arrangement 10 is driven by the actuator unit 2 and it is pivot-mounted inside the sheet metal housing 4, which form a box-shaped housing around the jackshaft arrangement 10. In contrast, the pole part housings 1 (exemplary) are mounted on the top of the sheet metal housing 4, realizing the rigid body of the circuit breaker arrangement. The jackshaft arrangement 10 inside the sheet metal housing 4 enables the transfer of drive force from the actuator unit 2 to the electrical poles inside the respective pole part housings 1.

Figure 3:
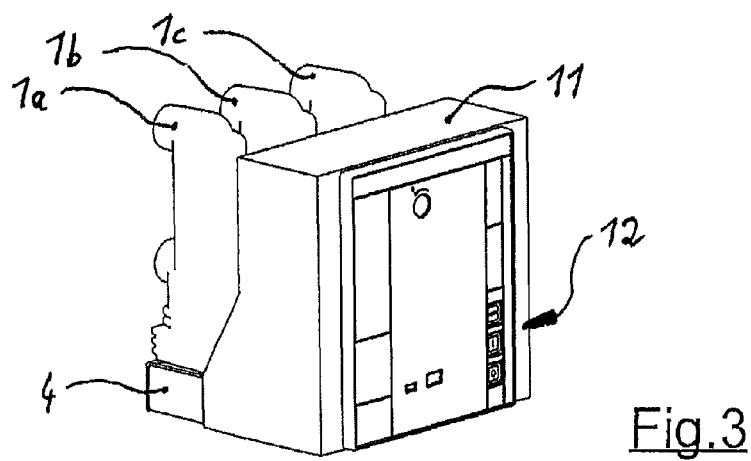
FIG. 3 is another perspective view of the circuit breaker shown in FIG. 1, with an additional housing part in accordance with an exemplary embodiment of the present disclosure.

FIG. 3 is another perspective view of the circuit breaker shown in FIG. 1, with an additional housing part in accordance with an exemplary embodiment of the present disclosure. As shown in FIG. 3, the sheet metal housing 4 which is designed as a kind of suspension construction for the pole part housings 1a-1c is completed with an additional housing part 11. The additional housing part 11 covers the (not shown) actuator unit 2 and defines the outer geometrical dimensions of the circuit breaker arrangement. Said additional housing part 11 is connected to the sheet metal housing 4 via clip connection means and consist of a relatively thin sheet metal material. Thus, the additional housing part 11 provides an additional volume for accommodating further attaching parts 12 at the circuit breaker arrangement.

Figure 4:
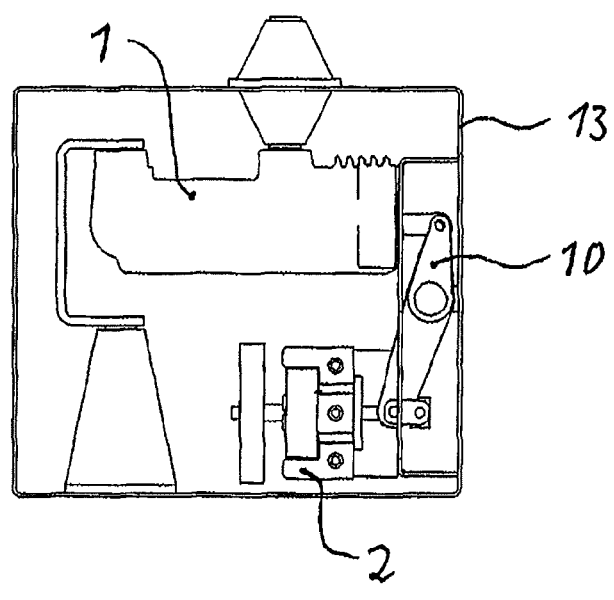
FIG. 4 is a schematic longitudinal section view to a first application of the circuit breaker arrangement in accordance with an exemplary embodiment of the present disclosure.

FIG. 4 is a schematic longitudinal section view to a first application of the circuit breaker arrangement in accordance with an exemplary embodiment of the present disclosure. As shown in FIG. 4, an actuator unit 2 which is designed as a single coil magnetic actuator is installed inside a circuit breaker compartment 13. The sheet metal housing 4 together with the pole part housings 1 (exemplary), the jackshaft arrangement 10 and the corresponding actuator unit 2 form a module. The module is installed in a gas insulated switch board. Thus, the module that is usually intended for an air-insulated circuit breaker as shown in FIG. 3 can also be used inside the circuit breaker compartment 13 of a gas-insulated medium voltage switch board. In that case the compartment 13 has to be classified as the additional housing part in view of the present disclosure. At least one advantage of the exemplary embodiments of the present disclosure is again standardization as known prior art designs foresee quite different circuit breakers for air- and gas insulated switch boards.

The fact that the actuator unit 2 is generally maintenance-free enables the approach to place the actuator unit 2 in a volume with restricted access. Additional components that specify only an electrical connection to the actuator unit 2 like energy storage and control can also be placed outside the circuit breaker compartment 13. The position of the actuator unit 2 can be traced magnetically. The function of the auxiliary switches can likewise by realized by the—not shown—control means.

Figure 5:
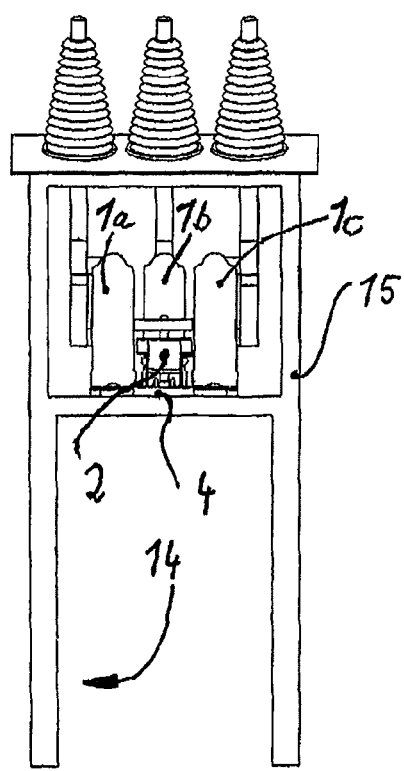
FIG. 5 is a schematic longitudinal section view to a second application of the circuit breaker arrangement in accordance with an exemplary embodiment of the present disclosure.

FIG. 5 is a schematic longitudinal section view to a second application of the circuit breaker arrangement in accordance with an exemplary embodiment of the present disclosure. As shown in FIG. 5, the same module comprising the sheet metal housing 4 with the three pole part housings 1a-1c, the—not shown—jackshaft arrangement and the actuator unit 2 can be used in outdoor applications like dead tank breakers 14 and so called "kiosk switch gear" as shown. In this case, the outdoor enclosure 15 that is available anyway serves as the additional housing part according to the present disclosure. Compared to existing prior art solutions, a double housing can be avoided.

Figure 6:
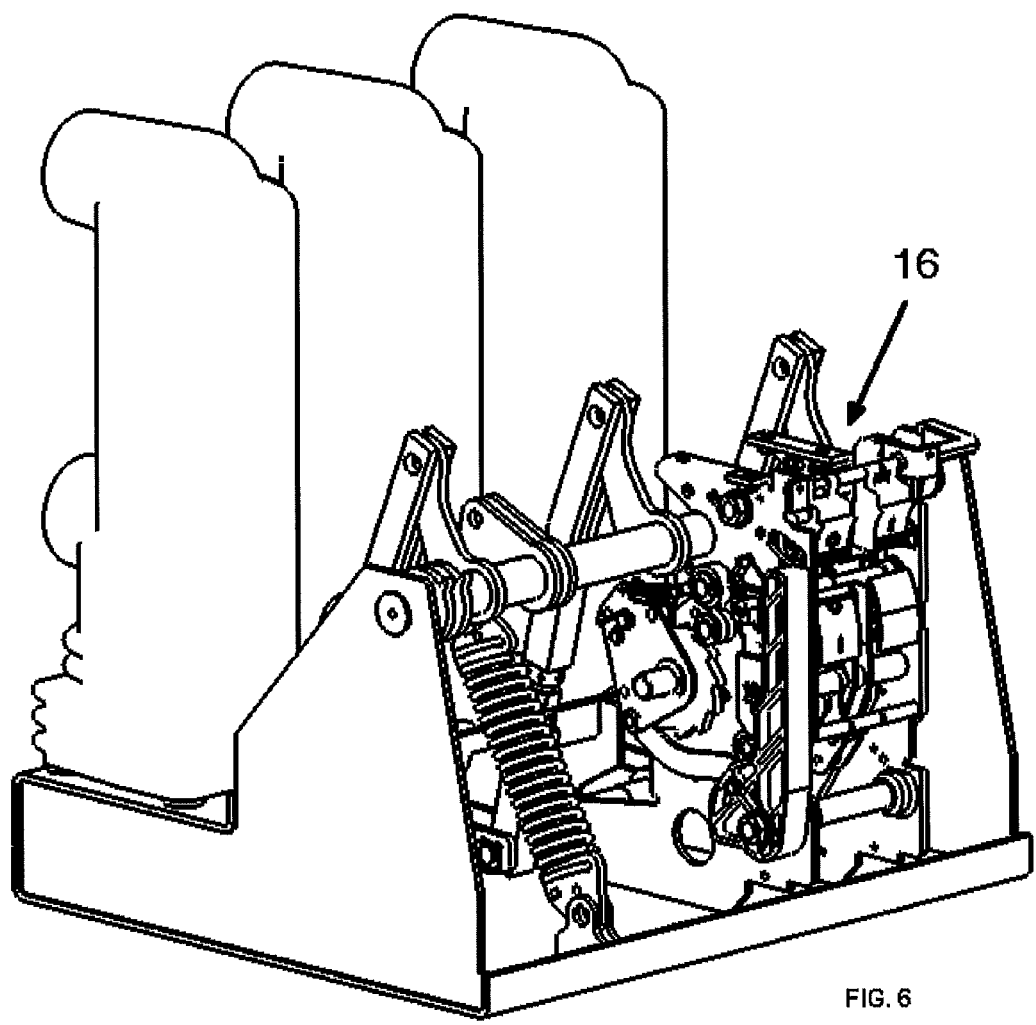
FIG. 6 is a perspective view of a medium voltage circuit breaker arrangement in accordance with an exemplary embodiment of the present disclosure.

FIG. 6 is a perspective view of a medium voltage circuit breaker arrangement in accordance with an exemplary embodiment of the present disclosure. FIG. 6 shows the module with a mechanical, spring-driven actuator 16 as the drive unit.

Furthermore, the module solution according to the present disclosure is also possible as a separate product. With additional components like energy storage, control or auxiliary switches that are mounted directly to the module a completely type and routine tested circuit breaker without housing is possible and advantageous for many applications.

The special solution according to exemplary embodiments disclosed herein is at first quite effective as only a few and small parts are being used which are easy to assemble. The exemplary module can be used for different types of circuit breakers as standardisation advantage results. This concept has a further advantage when the assembly is automated as the variance of the product appears relatively late in the production process.

Figure 7:
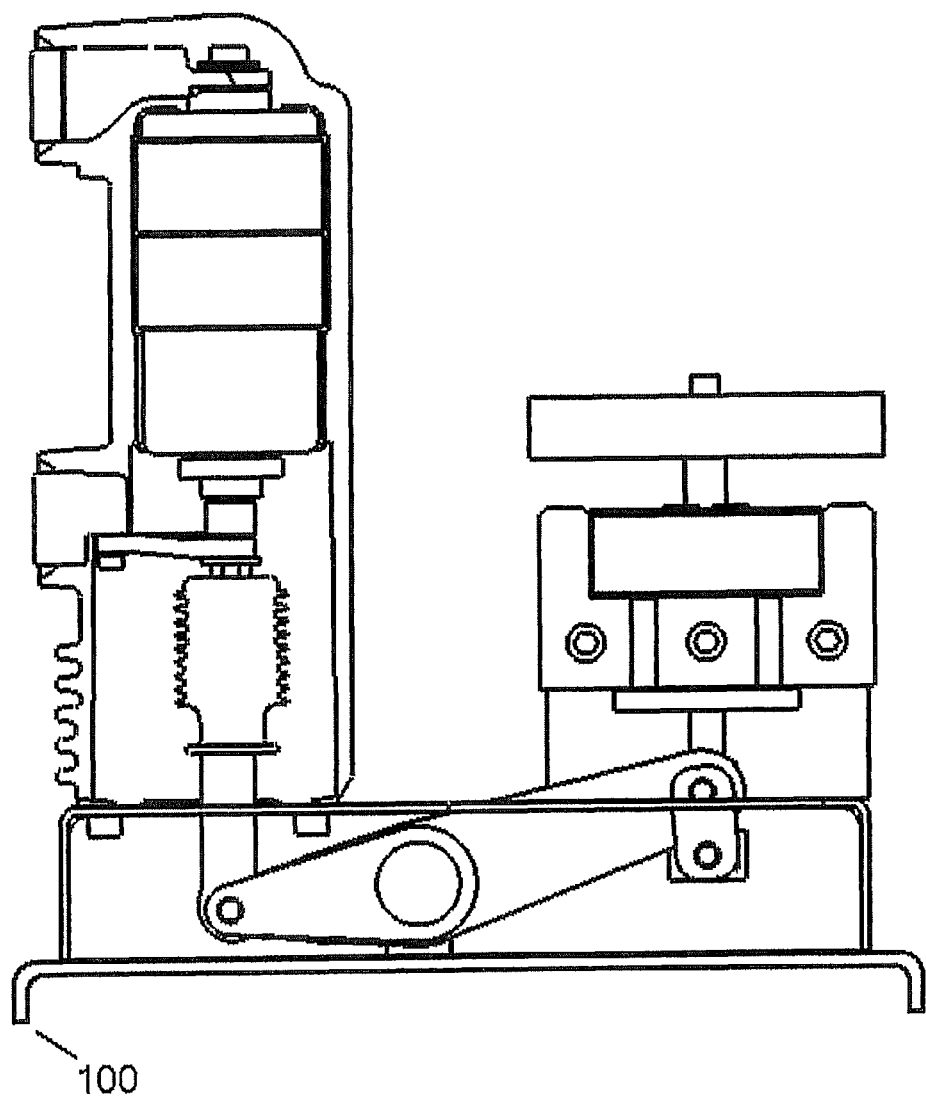
FIG. 7 is a schematic diagram of a mechanical interface in accordance with an exemplary embodiment of the present disclosure.

FIG. 7 is a schematic diagram of a mechanical interface in accordance with an exemplary embodiment of the present disclosure. FIG. 7 shows the use of the adaptive mechanical interface 100 located at the base frame, by which it is possible to use one common construction for different mechanical connections AIS, GIS, Outdoor, Switches, or other suitable devices or technologies as desired.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCE LIST

1 pole part housing
2 actuator unit
3 mounting surface
4 sheet metal housing
5 sheet metal part
6 side cover part
7 holding plate
8 intermediate opening
9 electrical contact
10 jackshaft arrangement
11 additional housing part
12 attaching parts
13 circuit breaker compartment
14 dead tank breaker
15 outdoor enclosure 16 spring driven actuator unit
100 mechanical interface

What is claimed is:

1. A medium voltage circuit breaker arrangement, comprising:
    at least one pole part housing for accommodating a pair of coaxially arranged electrical contacts, wherein one electrical contact of the pair of electrical contacts is axially movable via a jackshaft arrangement which is accommodated in a recasted sheet metal housing, and driven by an actuator unit,
    wherein the sheet metal housing forms a support construction for the at least one pole part housing and the actuator unit, which are both attached to a mounting surface of the support construction, and the support construction accommodating the jackshaft arrangement below the mounting surface thereby forming a module, and
    wherein an additional housing part is provided for covering at least the actuator unit of the module on the mounting surface of the support construction to define outer geometrical dimensions of the circuit breaker arrangement.

2. The medium voltage circuit breaker arrangement according to claim 1, wherein the circuit breaker has a base frame connected to earth contact, pole parts, mechanical coupling means and an actuator, and the base frame is coupled with a mechanical adaption interface such that the base frame is used as one of an air-insulted switchgear, a gas-insulated switchgear, or an outdoor switchgear.

3. The medium voltage circuit breaker arrangement according to claim 1, wherein the additional housing part is connected to the sheet metal housing via clip connection means.

4. The medium voltage circuit breaker arrangement according to claim 1, wherein the additional housing part includes a thin sheet metal material or a plastic sheet material.

5. The medium voltage circuit breaker arrangement according to claim 1, wherein the additional housing part provides an additional volume for accommodating further attaching parts.

6. The medium voltage circuit breaker arrangement according to claim 1, wherein the sheet metal housing includes a bended U-shaped sheet metal part with two side cover parts for providing a box-shaped housing arrangement containing the jackshaft arrangement.

7. The medium voltage circuit breaker arrangement according to claim 6, wherein both side cover parts includes the same sheet material as the U-shaped sheet metal part, and are attached one to another by brazing or welding.

8. The medium voltage circuit breaker arrangement according to claim 1, wherein a pair of L-shaped holding plates for detachable connection to the common actuator unit are arranged on a mounting surface of the U-shaped sheet metal part and adjacent to an intermediate opening for coupling the actuator unit to the jackshaft arrangement.

9. The medium voltage circuit breaker arrangement according to claim 8, wherein on a mounting surface of the U-shaped sheet metal part three pole part housings are detachably connected by screw connecting means.

10. The medium voltage circuit breaker arrangement according to claim 1, wherein the common actuator unit is realized as a single-coil or a double-coil electromagnetic actuator.

11. The medium voltage circuit breaker arrangement according to claim 1, wherein the actuator unit is a mechanical, spring-driven actuator.

12. A gas-insulated switchboard comprising:
    a medium voltage circuit breaker arrangement that includes:
    at least one pole part housing for accommodating a pair of coaxially arranged electrical contacts, wherein one electrical contact of the pair of electrical contacts is axially movable via a jackshaft arrangement which is accommodated in a recasted sheet metal housing, and driven by an actuator unit,
    wherein the sheet metal housing forms a support construction for the at least one pole part housing and the actuator unit, which are both attached to a mounting surface of the support construction, and the support construction accommodating the jackshaft arrangement below the mounting surface thereby forming a module, and
    wherein an additional housing part is provided for covering at least the actuator unit of the module on the mounting surface of the support construction to define outer geometrical dimensions of the circuit breaker arrangement.

13. The medium voltage circuit breaker arrangement according to claim 12, wherein the circuit breaker has a base frame connected to earth contact, pole parts, mechanical coupling means and an actuator, and the base frame is coupled with a mechanical adaption interface such that the base frame is used as one of an air-insulted switchgear, a gas-insulated switchgear, or an outdoor switchgear.

14. The medium voltage circuit breaker arrangement according to claim 12, wherein the additional housing part is connected to the sheet metal housing via clip connection means.

15. The medium voltage circuit breaker arrangement according to claim 12, wherein the additional housing part includes a thin sheet metal material or a plastic sheet material.

16. An air-insulated switchboard comprising:
    a medium voltage circuit breaker arrangement that includes:
    at least one pole part housing for accommodating a pair of coaxially arranged electrical contacts, wherein one electrical contact of the pair of electrical contacts is axially movable via a jackshaft arrangement which is accommodated in a recasted sheet metal housing, and driven by an actuator unit,
    wherein the sheet metal housing forms a support construction for the at least one pole part housing and the actuator unit, which are both attached to a mounting surface of the support construction, and the support construction accommodating the jackshaft arrangement below the mounting surface thereby forming a module, and
    wherein an additional housing part is provided for covering at least the actuator unit of the module on the mounting surface of the support construction to define outer geometrical dimensions of the circuit breaker arrangement.

17. The medium voltage circuit breaker arrangement according to claim 16, wherein the circuit breaker has a base frame connected to earth contact, pole parts, mechanical coupling means and an actuator, and the base frame is coupled with a mechanical adaption interface such that the base frame is used as one of an air-insulted switchgear, a gas-insulated switchgear, or an outdoor switchgear.

18. A dead tank breaker for outdoor use comprising:
    a medium voltage circuit breaker arrangement that includes:
    at least one pole part housing for accommodating a pair of coaxially arranged electrical contacts, wherein one electrical contact of the pair of electrical contacts is axially movable via a jackshaft arrangement which is accommodated in a recasted sheet metal housing, and driven by an actuator unit, wherein the sheet metal housing forms a for the at least one pole part housing and the actuator unit, which are both attached to a mounting surface of the support construction, and the support construction accommodating the jackshaft arrangement below the mounting surface thereby forming a module, and wherein an additional housing part is provided for covering at least the actuator unit of the module on the mounting surface of the support construction to define outer geometrical dimensions of the circuit breaker arrangement.

19. The medium voltage circuit breaker arrangement according to claim 18, wherein the additional housing part is connected to the sheet metal housing via clip connection means.

20. The medium voltage circuit breaker arrangement according to claim 18, wherein the additional housing part includes a thin sheet metal material or a plastic sheet material.

* * * * *